United States Patent
Tamaoka

(10) Patent No.: US 7,605,560 B2
(45) Date of Patent: Oct. 20, 2009

(54) MOTOR DRIVING APPARATUS

(75) Inventor: Shuji Tamaoka, Kyoto (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 11/746,924

(22) Filed: May 10, 2007

(65) Prior Publication Data

US 2007/0263992 A1    Nov. 15, 2007

(30) Foreign Application Priority Data

May 10, 2006    (JP) .............................. 2006-131284

(51) Int. Cl.
*G05B 19/18* (2006.01)
(52) U.S. Cl. .................. 318/569; 318/560; 318/400.16; 318/638; 318/652; 318/700
(58) Field of Classification Search ................. 318/286, 318/127, 400.01, 400.16, 638, 652, 678, 318/560, 569, 599, 152, 700, 721, 823; 388/811, 388/801, 828; 360/46, 67
See application file for complete search history.

(56) References Cited

U.S. PATENT DOCUMENTS

| | | | | |
|---|---|---|---|---|
| 5,066,914 A | * | 11/1991 | Vavrek et al. ................ | 324/309 |
| 5,173,645 A | * | 12/1992 | Naito ..................... | 318/400.04 |
| 6,242,875 B1 | * | 6/2001 | Kusaka et al. ........... | 318/400.32 |
| 6,566,838 B2 | * | 5/2003 | Maiocchi ..................... | 318/652 |
| 6,693,400 B2 | * | 2/2004 | Pedrazzini et al. .......... | 318/567 |
| 6,697,205 B2 | * | 2/2004 | Cyrusian et al. ............. | 360/68 |
| 6,710,572 B2 | * | 3/2004 | Okubo ....................... | 318/727 |
| 6,724,166 B2 | * | 4/2004 | Narumi et al. .......... | 318/400.23 |
| 6,806,663 B2 | * | 10/2004 | Kusaka et al. .......... | 318/400.17 |
| 6,873,125 B2 | * | 3/2005 | Seima et al. ........... | 318/400.09 |
| 6,969,963 B2 | * | 11/2005 | Sakai et al. ............ | 318/400.27 |
| 6,995,537 B1 | * | 2/2006 | Plutowski et al. ....... | 318/400.04 |
| 7,034,490 B2 | * | 4/2006 | Sawtell et al. ............... | 318/569 |
| 7,218,072 B2 | * | 5/2007 | Sugiura et al. ......... | 318/400.11 |

FOREIGN PATENT DOCUMENTS

JP          04-101694          4/1992

* cited by examiner

*Primary Examiner*—Bentsu Ro
*Assistant Examiner*—Antony M Paul
(74) *Attorney, Agent, or Firm*—RatnerPrestia

(57) ABSTRACT

There is provided a motor driving apparatus in which variations in individual circuit constants have a small effect even when a drive current is small. An error amplifier circuit amplifies a difference between a current detection signal showing a current value of a drive current that flows in the motor and a drive command signal controlling the drive current and converts an amplified difference into a current to output the current as an error amplifier current signal. A D/A conversion circuit generates a sinusoidal signal from the error amplifier current signal based on a digital signal sequence outputted from a rotational position detecting unit. It is preferable that a transfer coefficient of the error amplifier circuit is inversely proportional to the resistance value of the D/A conversion circuit.

7 Claims, 11 Drawing Sheets

MOTOR DRIVING APPARATUS

BACKGROUND OF THE INVENTION

1. Field of the Invention

The present invention relates to a motor driving apparatus for driving a motor.

2. Related Art

JP-A-4-101694 discloses a conventional motor driving apparatus which performs switching control of a power transistor connected to three-phase coils of a motor to control a current that flows in the three-phase coils. The conventional motor driving apparatus is described by means of FIGS. 10 and 11.

In the conventional motor driving apparatus shown in FIG. 10, a rotational position detector 11 detects a position of a rotor of a motor 7 by use of hall elements 11U, 11V, 11W to generate rotational position detection signals H1, H2, H3. A hall amplifier 11b amplifies the rotational position detection signals H1, H2, H3 and shapes waveforms to generate and output sinusoidal signals S1, S2, S3 to a multiplication circuit 2a.

A current detection circuit 4 has a detection resistor for detecting a drive current Im that flows in the motor 7 as a voltage value, and the current detection circuit 4 outputs a current detection signal Vcs. An error amplifier circuit 6a amplifies the difference between the current detection signal Vcs and a drive command signal Vec that controls the drive current Im inputted into an input terminal 5, and converts the amplified difference into a current to output the current as an error amplifier current signal Ir to the multiplication circuit 2a.

The multiplication circuit 2a multiplies the sinusoidal signals S1, S2, S3 outputted from the hall amplifier 11b by the error amplifier current signal Ir outputted from the error amplifier circuit 6a to generate and output input command signals Vuin, Vvin, Vwin.

The drive circuit 3 has a switching control circuit 32 and a power supply circuit 33. The switching control circuit 32 compares the input command signals Vuin, Vvin, Vwin with a carrier wave Vtri which is a triangle wave inputted into an input terminal 31, and performs pulse width modulation to output switching control signals UPWM, VPWM, WPWM. The power supply circuit 33 performs switching control of power transistors 331 to 336 based on the switching control signals UPWM, VPWM, WPWM in a gate drive circuit 337, and generates drive voltages Uout, Vout, Wout from a power supply 338 to output the generated voltages to three-phase coils 71, 72, 73 of the motor 7.

The conventional motor driving apparatus with the configuration as thus described controls amplitudes of the input command signals Vuin, Vvin, Vwin by means of the difference between the current detection signal Vcs and the drive command signal Vec, and pulse-width-modulates the switching control signals UPWM, VPWM, WPWM to control the drive current Im that flows in the three-phase coils 71, 72, 73.

A gain of the conventional-motor driving apparatus is described with reference to a block diagram of FIG. 11.

The rotational position detection signals H1, H2, H3 having a voltage amplitude value Vh outputted from the rotational position detector 11 are amplified by the hall amplifier 11b having a voltage amplification coefficient Ah, and signals having a voltage amplitude value of (Ah×Vh) are inputted into the multiplication circuit 2a.

When a transfer coefficient Ae of the error amplifier circuit 6a is defined as "Ir/(Vec−Vcs)", the error amplifier current signal Ir expressed by the following expression (1) is inputted into the multiplication circuit 2a.

$$Ir = Ae \times (Vec - Vcs) \quad (1)$$

The multiplication circuit 2a having a transfer coefficient Am multiplies the signal (Ah×Vh) by the error amplifier current signal Ir to output the input command signals Vuin, Vvin, Vwin of a voltage amplitude value Vd. The voltage amplitude value Vd of the input command signals Vuin, Vvin, Vwin is expressed by the following expression (2).

$$Vd = Am \times Ah \times Vh \times Ir \quad (2)$$

A transfer coefficient Gm of the drive circuit 3 with respect to the voltage amplitude value Vd shows a transfer characteristic of the drive current Im with respect to the voltage amplitude value Vd of the input command signal Vuin Vvin, Vwin in a case where prescribed values are given as an amplitude value and a frequency of the carrier wave Vtri. Therefore, the drive current Im is expressed by the following expression (3).

$$Im = Gm \times Vd \quad (3)$$

The current detection signal Vcs outputted from the current detection circuit 4 is expressed by the following expression (4) using the drive current Im outputted from the drive circuit 3 and a resistance value Rcs of the detection resistor in the current detection circuit 4. In addition, in a case where the detection resistor is not used in the current detection circuit 4, the coefficient Rcs shows a coefficient which converts current to voltage.

$$Vcs = Im \times Rcs \quad (4)$$

From the expressions (1), (2), (3), the drive current Im is expressed by the following expression (5).

$$Im = Gm \times Am \times Ah \times Vh \times Ae \times (Vec - Vcs) \quad (5)$$

From the expressions (4), (5), the gain (defined as Im/Vec) of the motor driving apparatus is expressed by the following expression (6).

$$Im/Vec = 1/\{1/(Gm \times Am \times Ae \times Ah \times Vh) + Rcs\} \quad (6)$$

In the above expression (6) for the gain of the drive apparatus, when the first term of the denominator on the right-hand side, 1/(Gm×Am×Ae×Ah×Vh), is very small as compared with Rcs, the first term of the denominator can be ignored. Hence, the gain of the drive apparatus is expressed by the following expression. In this case, the circuit constants of Gm, Am and the like exert no effect.

$$Im/Vec \approx 1/Rcs \quad (7)$$

However, in the case of driving the motor 7 with the small drive current Im, for example in the case of performing drive control while keeping the number of rotation of the motor 7 very small, the voltage amplitude value Vd of the input command signals Vuin, Vvin, Vwin becomes very small. When the voltage amplitude value Vd is small, a value of the transfer coefficient Gm of the drive circuit 3 becomes small, and as a result, the first term of the denominator, 1/(Gm×Am×Ae×Ah×Vh), in the expression (6) becomes large. The value of the first term depends upon the circuit constants of Gm, Am, Ae, Ah and Vh, and since these circuit constants vary, variations in the gain of the motor driving apparatus become large.

As thus described, as for the conventional motor driving apparatus that performs PWM-driving, when the voltage amplitude value Vd of the input command signals Vuin, Vvin, Vwin is large, that is, when the drive current Im is large, the variations in circuit constants of the motor driving apparatus have a small effect as shown in the expression (6), and therefore, the individual motor driving apparatuses can drive a motor with similar characteristics. However, when the voltage amplitude value Vd is small, that is, when the drive current Im is small, the variations in circuit constants of the motor driving apparatus have a large effect to cause variations in the gain to depend upon the individual motor driving apparatuses. There has thus been a problem in that the conventional motor driving apparatus cannot drive a motor with similar characteristics to cause variations in number of rotation of the motor to depend upon the individual motor driving apparatuses.

SUMMARY OF THE INVENTION

In view of the above problem, the present invention provides a motor driving apparatus that reduces variations of gains of the motor driving apparatus, even when the voltage amplitude value Vd of the input command signals Vuin, Vvin, Vwin is small, that is, when the drive current Im is small, so that the individual motor driving apparatus can PWM-drive a motor with similar characteristics.

The motor driving apparatus of the present invention has a rotational position detecting unit for detecting a rotational position of a motor to output a digital signal sequence according to the rotational position, a D/A conversion circuit for generating an analog sinusoidal signal based on the digital signal sequence, and a drive circuit for generating and outputting a drive voltage to the motor by means of the sinusoidal signal.

According to the present invention, it is possible to delete from a gain of the motor driving apparatus of the present invention a circuit constant of the rotational position detecting unit included in the gain of the conventional motor driving apparatus. Thereby, an effect of variations in circuit constants does not become large even when a drive current that flows in the motor is small.

The motor driving apparatus further may have an error amplifier circuit for amplifying a difference between a current detection signal showing a current value of a drive current that flows in the motor and a drive command signal controlling the drive current, and converting the amplified difference into a current to output the current as an error amplifier current signal. The D/A conversion circuit may have a resistor. A transfer coefficient of the error amplifier circuit may be inversely proportional to a resistance value of the D/A conversion circuit. Here, the transfer coefficient of the error amplifier circuit is a value showing a ratio of the error amplifier current signal to the difference between the drive command signal and the current detection signal. Since the voltage amplitude value of the sinusoidal signal generated in the D/A conversion circuit is determined by a product of the current value of the error amplifier current signal and the resistance value of the current/voltage conversion of the D/A conversion circuit, when an error amplifier circuit satisfying the above relation is used, the voltage amplitude value of the sinusoidal signal generated in the D/A conversion circuit is a value obtained by multiplying the difference between the current detection signal and the drive command signal by a proportional constant. That is, it becomes possible to delete a factor of variations due to the resistance in the D/A conversion circuit and the transfer coefficient of the error amplifier circuit from the gain of the motor driving apparatus of the present invention. This prevents variations in number of rotation of a motor depending upon the individual apparatus even when the drive current is small.

The D/A conversion circuit may have a resistor string, which has a plurality of resistors connected in series and is connected to the error amplifier circuit to input the error amplifier current signal, and a plurality of switch elements, which are provided in the same number as the number of coil phases of the motor with respect to the respective resistors of the resistor string, and switch ON/OFF based on the digital signal sequence to output a voltage as the sinusoidal signal from any of connecting points between the plurality of resistors connected in series in the resistor string.

The D/A conversion circuit may have a D/A conversion section for each of the coil phases of the motor, and the D/A conversion section may have a current mirror circuit for outputting a plurality of currents proportional to the error amplifier current signal, a resistor for outputting, as the sinusoidal signal, a voltage generated by flowing of the current from the current mirror circuit, and a plurality of switch elements for switching conduction and cutoff of the plurality of currents flowing from the current mirror circuit into the resistor based on the digital signal sequence.

The current mirror circuit may be organized by bipolar transistors or MOS transistors.

The error amplifier circuit may have a differential amplifier circuit for amplifying the difference between the current detection signal and the drive command signal to output the amplified difference, and a V/I conversion circuit for outputting the error amplifier current signal by dividing the output voltage of the differential amplifier circuit by the resistance value which is proportional to the resistance of the D/A conversion circuit.

The V/I conversion circuit may have an operational amplifier with a non-inverting input terminal into which the output voltage of the differential amplifier circuit is inputted, a transistor with its one end connected to an inverting input terminal of the operational amplifier, with its control terminal connected to an output terminal of the operational amplifier, and with its other end outputting the error amplifier current signal, and a resistor which is connected to a connecting point between the transistor and the inverting input terminal of the operational amplifier, and the value of the resistor may be in an proportional relation with the value of the resistor of the D/A conversion circuit.

The rotational position detecting unit may have a rotational position detector for detecting a rotational position of the motor to output a rotational position detection signal of a sinusoidal signal, a rotational cycle detection circuit for converting the rotational position detection signal into a rotational cycle signal of a rectangular wave showing a rotational cycle of the motor, and a digital signal generation circuit for generating a clock signal from the rotational cycle signal, and while counting a cycle of the rotational cycle signal based on the clock signal, converting the count value into the digital signal sequence at a timing of the clock signal to output the digital signal sequence.

According to the motor driving apparatus of the present invention, it is possible to obtain an effect that variations in the gain of the motor driving apparatus are reduced even in the case of driving a motor with a small drive current to allow the individual motor driving apparatuses to drive a motor with similar characteristics.

DETAILED DESCRIPTION OF THE PREFERRED EMBODIMENTS

Embodiments specifically showing the best modes for carrying out the present invention are described with reference to drawings.

First Embodiment

Figure 1:
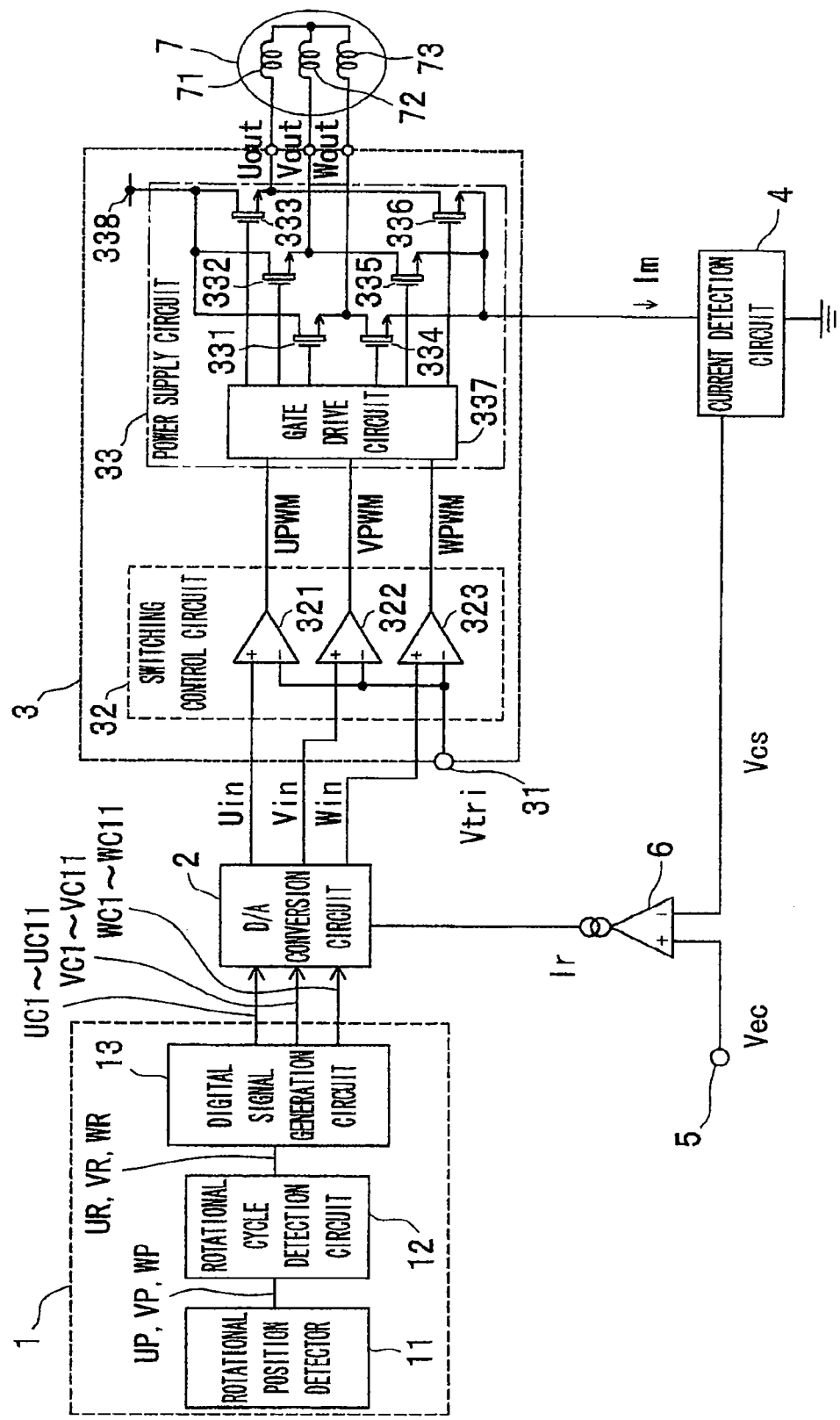
FIG. 1 is a view showing a configuration of a motor driving apparatus in a first embodiment of the present invention.

Using FIGS. 1 to 7, a motor driving apparatus of a first embodiment of the present invention is described. FIG. 1 shows a motor driving apparatus of the present embodiment and a motor 7 driven by the motor driving apparatus. The motor 7 has a stator (not shown) having three-phase (U-phase, V-phase, W-phase) coils 71, 72, 73 which are Y-connected, and a rotor (not shown) that has a field section using a permanent magnet. The motor driving apparatus allows a current to flow in the three-phase coils 71, 72, 73 to rotate the rotor.

The motor driving apparatus of the present embodiment has: a rotational position detecting unit 1 for detecting a rotational position of the rotor of the motor 7; a D/A conversion circuit 2 for generating sinusoidal signals Uin, Vin, Win from an error amplifier current signal Ir based on an output of the rotational position detecting unit 1; and a drive circuit 3 for generating and supplying drive voltages Uout, Vout, Wout to the motor 7 based on the sinusoidal signals Uin, Vin, Win.

The motor driving apparatus further has: a current detection circuit 4 for detecting a drive current Im that flows in the motor 7 to output a current detection signal Vcs; an input terminal 5 for inputting a drive command signal Vec that controls the drive current Im; and an error amplifier circuit 6 for outputting the error amplifier current signal Ir based on the difference between the drive command signal Vec and the current detection signal Vcs.

In order for the D/A conversion circuit 2 to generate digital signal sequences UC1 to UC11, VC1 to VC11, WC1 to WC11 which are necessary for formation of the sinusoidal signals Uin, Vin, Win for one rotation in an electrical angle, the rotational position detecting unit 1 includes: a rotational position detector 11 for detecting the rotational position of the rotor of the motor 7 to output rotational position detection signals UP, VP, WP; a rotational cycle detection circuit 12 for detecting rotational cycles of the motor 7 from the rotational position detection signals UP, VP, WP to output rotational cycle signals UR, VR, WR; and a digital signal generation circuit 13 for generating the digital signal sequences UC1 to UC11, VC1 to VC11, WC1 to WC11 based on the rotational cycle signals UR, VR, WR.

The drive circuit 3 includes an input terminal 31 for inputting a carrier wave Vtri which is a triangle wave; a switching control circuit 32 which includes comparators 321, 322, 323 for comparing the sinusoidal signals Uin, Vin, Win with the triangle wave Vtri and outputs switching control signals UPWM, VPWM, WPWM; and a power supply circuit 33 for generating the drive voltages Uout, Vout, Wout based on the switching control signals UPWM, VPWM, WPWM to supply the generated voltages to the motor 7.

The power supply circuit 33 includes: upper power transistors 331, 332, 333; lower power transistors 334, 335, 336 which are connected in series with the upper power transistors 331, 332, 333; a gate drive circuit 337 for controlling ON/OFF of the power transistors 331 to 336 based on the switching control signals UPWM, VPWM, WPWM; and a power supply 338 for supplying power to the upper power transistors 331, 332, 333.

The motor driving apparatus of the present embodiment with the configuration as thus described controls amplitudes of the sinusoidal signals Uin, Vin, Win based on the error amplifier current signal Ir to pulse-width-modulate the switching control signals UPWM, VPWM, WPWM. Thereby, the gate drive circuit 337 controls the on-time of the power transistors 331 to 336 to control the drive current Im that flows in the three-phase coils 71, 72, 73. For example, when the drive current Im that flows from the power supply circuit 33 into the three-phase coils 71, 72, 73 is small with respect to some given drive command signal Vec, the current detection signal Vcs becomes small. Hence, the difference of the current detection signal Vcs from the drive command signal Vec becomes large, so that the amplitudes of the sinusoidal signals Uin, Vin, Win become large. As a result, the drive current Im becomes large, and thereby a negative feedback operation is performed in a direction so as to make the current detection signal Vcs large. Consequently, the current detection signal Vcs becomes equivalent to the drive command signal Vec.

Figure 2:
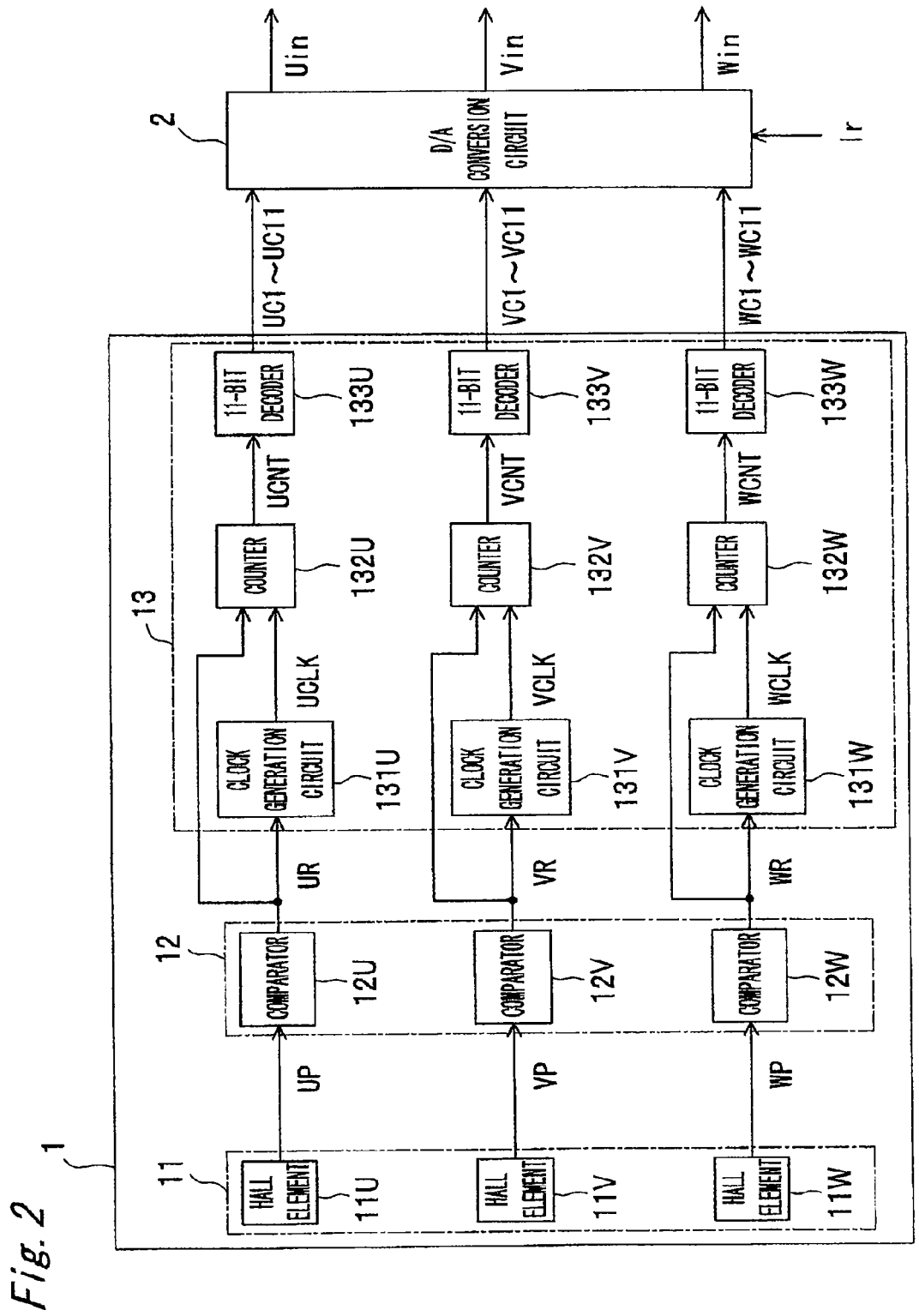
FIG. 2 is a view showing an internal configuration of a rotational position detecting unit 1 of the present invention.
Figure 3:
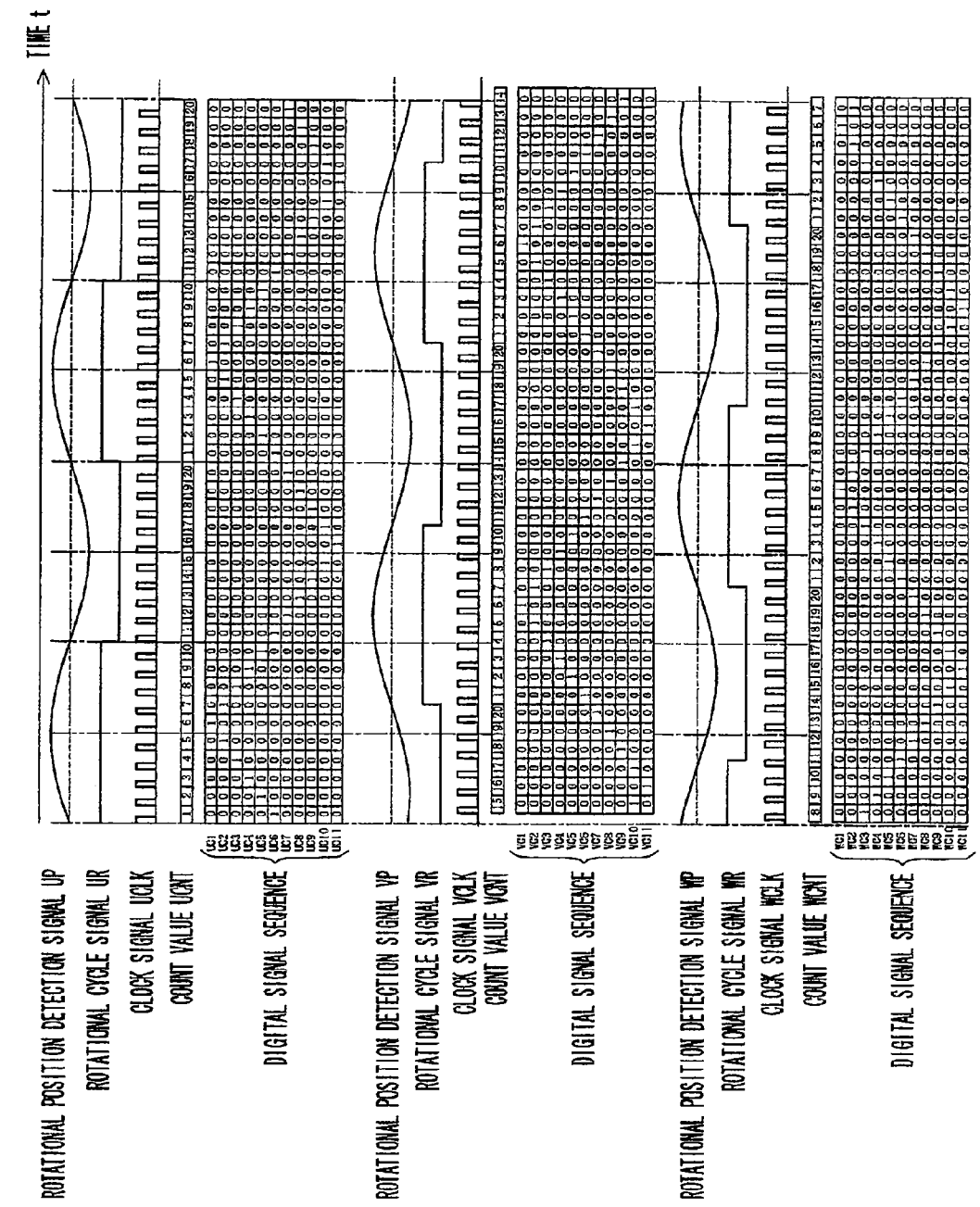
FIG. 3 is a waveform view of signals generated inside the rotational position detecting unit 1 of the present invention.

Next, the configurations of the rotational position detector 11, the rotational cycle detection circuit 12 and the digital signal generation circuit 13, as well as waveforms of signals generated in the circuits, are described with reference to FIGS. 2 and 3. FIG. 2 shows internal configurations of the rotational position detector 11, the rotational cycle detection circuit 12 and the digital signal generation circuit 13. FIG. 3 shows waveforms of the signals generated inside the rotational position detector 11, the rotational cycle detection circuit 12 and the digital signal generation circuit 13.

As shown in FIG. 2, the rotational position detector 11 has hall elements 11U, 11V, 11W which detect the rotational magnetic field of the rotor of the motor 7 to output the rotational position detection signals UP, VP, WP. The hall elements 11U, 11V, 11W are arranged as displaced by an electrical angle of 120 degrees, and the rotational position detection signals UP, VP, WP are in a phase relation displaced by 120 degrees each, as shown in FIG. 3.

The rotational cycle detection circuit 12 has three comparators 12U, 12V, 12W for detecting switching of polarities of the rotational position detection signals UP, VP, WP. The comparators 12U, 12V, 12W output rotational cycle signals UR, VR, WR (see FIG. 3) of rectangular waves that alternatively switch the output between an H-level zone (H-zone) and an L-level zone (L-zone) at an electrical angle of 180 degrees each (see FIG. 3) to transmit rotational cycles to the digital signal generation circuit 13 depending upon the length of the H-zone or the L-zone.

The digital signal generation circuit 13 includes clock generation circuits 131U, 131V, 131W; counters 132U, 132V, 132W; and 11-bit decoders 133U, 133V, 133W. The clock generation circuits 131U, 131V, 131W generate clock signals UCLK, VCLK, WCLK by the unit of the electrical angle from the rotational cycle signals UR, VR, WR. The counters 132U, 132V, 132W count the clock signals UCLK, VCLK, WCLK by the unit of the electrical angle. The 11-bit decoders 133U, 133V, 133W decode the measured count values UCNT, VCNT, WCNT to output the 11-bit digital signal sequences UC1 to UC11, VC1 to VC11, WC1 to WC11.

The counters 132U, 132V, 132W count up the measured count values UCNT, VCNT, WCNT during a cycle of the rotational cycle signals UR, VR, WR, that is, during one rotation in a motor electrical angle, and recount from one when a next one rotation starts. As shown in FIG. 3, the counters 132U, 132V, 132W count up the count values up to 20. The digital signal sequences UC1 to UC11, VC1 to VC11, WC1 to WC11 obtained by decoding the count values UCNT, VCNT WCNT are each composed of one bit indicating 1 and the other 10 bits indicating 0. The signal sequences UC1 to UC11, VC1 to VC11, WC1 to WC11 are inputted into the D/A conversion circuit 2.

Figure 4:
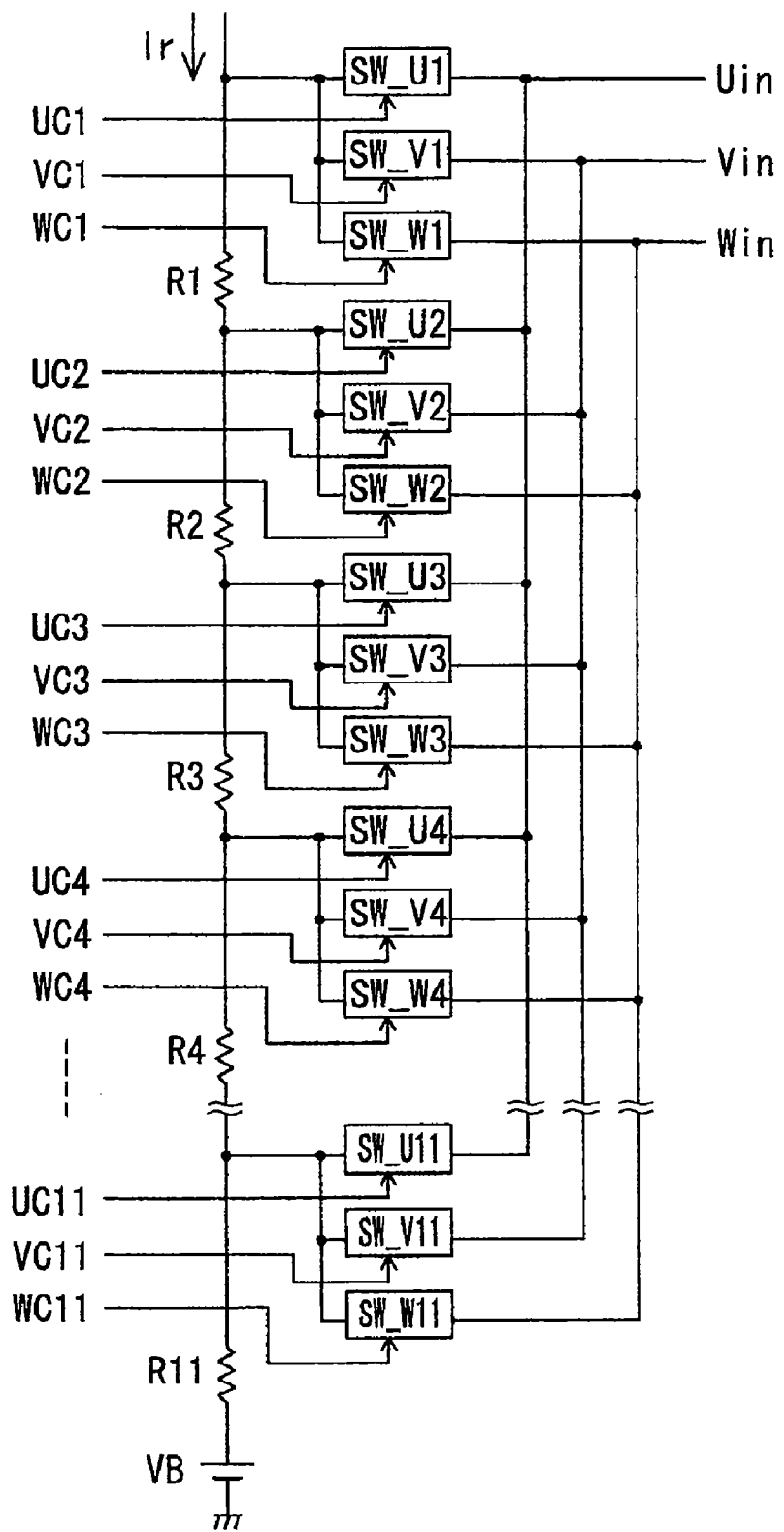
FIG. 4 is a view showing an internal configuration of a D/A conversion circuit 2 in the first embodiment of the present invention.

FIG. 4 shows an internal circuit of the D/A conversion circuit 2. The D/A conversion circuit 2 includes: a string of resistors R1 to R11, of which one end is connected to the error amplifier circuit 6 and supplied with the error amplifier current signal Ir; a power supply VB connected to the other end of the string of resistors R1 to R11; and a plurality of switch elements SW_U1, SW_V1, SW_W1 to SW_U11, SW_V11, SW_W11 which output a voltage from any of the connecting points in the string of resistors R1 to R11.

The string of resistors R1 to R11 is configured by connecting in series eleven resistors having prescribed resistance values. With respect to one resistor Rk ($1 \leq k \leq 11$), the switch elements SW_Uk, SW_Vk, SW_Wk are provided relative to each of coil phases (three phases in the present embodiment) of the motor. That is, one ends of the switch elements SW_U1, SW_V1, SW_W1 are connected to positions between the resistor R1 and the error amplifier circuit 6, and one ends of the switch elements SW_Uk ($2 \leq k \leq 11$), SW_Vk, SW_Wk are connected to the connecting points between the resistor Rk and the resistor R(k−1). The other ends of the switch elements SW U1 to SW_U11 are connected to one another, and a voltage outputted from the other ends is the sinusoidal signal Uin. Similarly, the other ends of the switch elements SW_V1 to SW_V11 and the switch elements SW_W1 to SW_W11 are connected to one another, and voltages outputted from the other ends are the sinusoidal signals Vin, Win, respectively. The power supply VB is provided between the resistor R11 and a ground in order to give a bias voltage to the sinusoidal signals Uin, Vin, Win.

The switch elements SW_U1 to SW_U11, SW_V1 to SW_V11, SW_W1 to SW_W11 switch ON/OFF of switches based on the digital signal sequences UC1 to UC11, VC1 to VC11, WC1 to WC11 which are outputted from the digital signal generation circuit 13. For example, in FIG. 3, when the current value UCNT of the U-phase is five, a digital signal sequence of (01000000000) is outputted from the 11-bit decoder 133U of the digital signal generation circuit 13, and out of the plurality of the U-phase switch elements SW_U1 to SW_U11 of the D/A conversion circuit 2, only the switch element SW_U2 is switched on while the other U-phase switch elements are switched off. Thereby, a voltage is outputted from the connection point between the resistors R1 and R2. In the same manner, for the V-phase and the W-phase, out of the switch elements SW_V1 to SW_V11, SW_W1 to SW_W11, only one switch element is switched on while the other elements are switched off, respectively.

As shown in FIG. 3, a position of the bit of the digital signal sequence which indicates "1" is shifted one by one, for example from UC1 to UC2, or from UC2 to UC3, according to the count values UCNT, VCNT, WCNT. Thereby, the switch element to be switched on shifts one by one, such as from SW_U1 to SW_U2, and from SW_U2 to SW_U3. Consequently, the voltage Uin outputted from the other ends of the switch elements SW_U1 to SW_U11 is a sinusoidal wave. The phases of three sinusoidal signals Uin, Vin, Win are displaced by 120 degrees corresponding to each motor phase, and the sinusoidal signals Uin, Vin Win are inputted into the switching control circuit 32.

In the switching control circuit 32 shown in FIG. 1, the sinusoidal signals Uin, Vin, Win which are outputted from the D/A conversion circuit 2 are inputted into the non-inverting input terminals of the comparators 321, 322, 323, the carrier wave Vtri of a triangle wave having a prescribed frequency and an amplitude value which has been inputted into the input terminal 31 are inputted into the inverting control terminals of the comparators 321, 322, 323. The comparators 321, 322, 333 compare the sinusoidal signals Uin, Vin, Win with the carrier wave Vtri to output the pulse-width-modulated switching control signals UPWM, VPWM, WPWM. The switching control signals UPWM, VPWM, WPWM are inputted into the gate drive circuit 337 of the power supply circuit 33.

The gate drive circuit 337 controls ON/OFF of the upper power transistors 331, 332, 333 and the lower power transistors 334, 335, 336 based on the switching control signals UPWM, VPWM, WPWM. The gate drive circuit 337 switches on one upper power transistor and one or two lower power transistors which are not connected in series to the one upper power transistor. Or, the gate drive circuit 337 switches on two upper power transistors and one lower power transistor which is not connected in series to the two upper power transistors. For example, in the case of switching on the upper power transistor 333 and the lower power transistor 334, the drive current Im flows from the power supply 338 into the U-phase coil 71 via the upper power transistor 333, and the drive current Im then flows into the current detection circuit 4 via the W-phase coil 73 and the lower power transistor 334. A penetration prevention period in which the upper and lower power transistors are both switched off is set in the gate drive circuit 337 for the purpose of preventing direct flowing of the current supplied from the power supply 338 into the current detection circuit 4 without passing through the three-phase coils 71, 72, 73 in cases when the upper power transistor 331 and the lower power transistor 334, the transistors 332 and 335 or the transistors 333 and 336, which are connected in series with each other, are simultaneously switched on respectively.

The current detection circuit 4 has: a detection resistor (not shown) for detecting the drive current Im as a voltage value; and a low-pass filter (not shown) for smoothing the voltage value, and outputs the current detection signal Vcs. In addition, although the detection resistor is used to detect the drive current Im in the present embodiment, the detection resistor may not be used and another method may be used to convert the drive current Im into a voltage.

Figure 5:
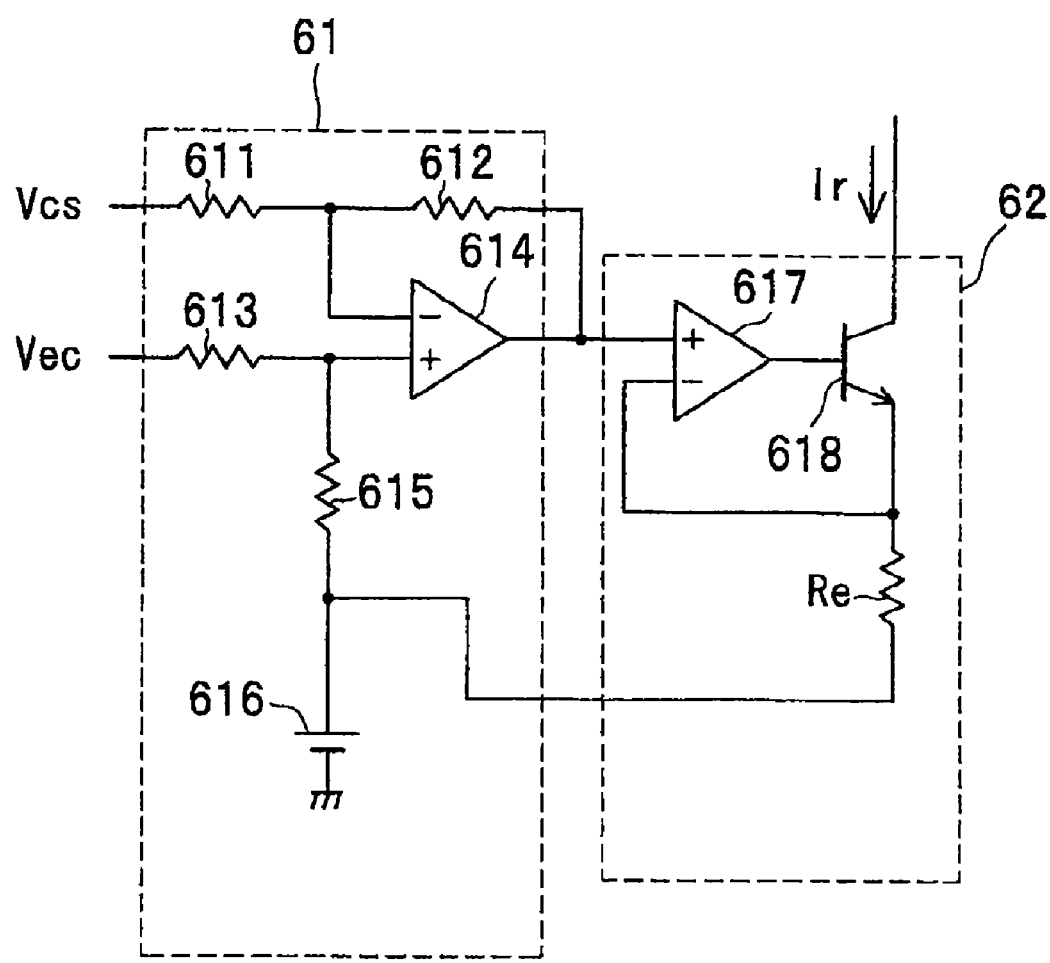
FIG. 5 is a view showing internal circuits of an error amplifier circuit 6 of the present invention.

FIG. 5 shows internal circuits of the error amplifier circuit 6. The error amplifier circuit 6 is a gm amplifier having: a differential amplifier circuit 61 for comparing the drive command signal Vec with the current detection signal Vcs; and a V/I conversion circuit 62 for converting an output voltage of the differential amplifier circuit 61 into a current to output the current as the error amplifier current signal Ir.

The differential amplifier circuit 61 has: a resistor 611 into which the current detection signal Vcs is inputted from its one end; a resistor 613 into which the drive command signal Vec is inputted from its one end; an operational amplifier 614 with an inverting input terminal connected to other end of the resistor 611 and with a non-inverting input terminal connected to other end of the resistor 613; a resistor 612 connected to a position between an output terminal and the non-inverting input terminal of the operational amplifier 614; a resistor 615 with one end connected to a position between the resistor 613 and the non-inverting input terminal of the operational amplifier 614; and a power supply 616 which is connected to other end of the resistor 615 and serves as a reference potential. As thus described, the differential amplifier circuit 61 is configured to be of a differential amplifier circuit type having a prescribed gain, and outputs a voltage proportional to (Vec−Vcs) from the output terminal of the operational amplifier 614.

The V/I conversion circuit 62 includes: an operational amplifier 617 with a non-inverting input terminal connected with the output terminal of the operational amplifier 614; an NPN transistor 618 with base connected to an output terminal of the operational amplifier 617 and with its emitter connected to an inverting control terminal of the operational amplifier 617; and a resistor Re with its one end connected to the connecting point between the emitter of the NPN transistor 618 and the inverting control terminal of the operational amplifier 617 and with its other end connected to the power supply 616. It is to be noted that the other end of the resistor Re may be connected to the ground. As thus described, the V/I conversion circuit 62 is configured of a voltage follower type in which the voltage of the inverting control terminal of the operational amplifier 617 follows the output voltage of the differential amplifier circuit 61, and outputs the error amplifier current signal Ir from a collector of the NPN transistor 618.

A resistance ratio by the resistors 611, 612, 613, and 615 of FIG. 5 is expressed by α, and the error amplifier current signal Ir can be expressed by the following expression (8).

$$Ir=\alpha(Vec-Vcs)/Re \qquad (8)$$

The motor driving apparatus of the present invention uses the error amplifier circuit 6 in which the relation between the resistance value of the resistor Re in the error amplifier circuit 6 and the total resistance value RG of the resistor strings R1 to R11 in the D/A conversion circuit 2 satisfies "RG/Re=β (β is a proportional constant)". In this case, the error amplifier current signal Ir can be expressed by the following expression (9).

$$Ir=\alpha\times\beta\times(Vec-Vcs)/RG \qquad (9)$$

As shown in the expression (9), the error amplifier current signal Ir is proportional to a value obtained by dividing the output voltage α (Vec−Vcs) of the differential amplifier circuit 61 by the total resistance value RG of the resistor strings in the D/A conversion circuit 2.

Figure 6:
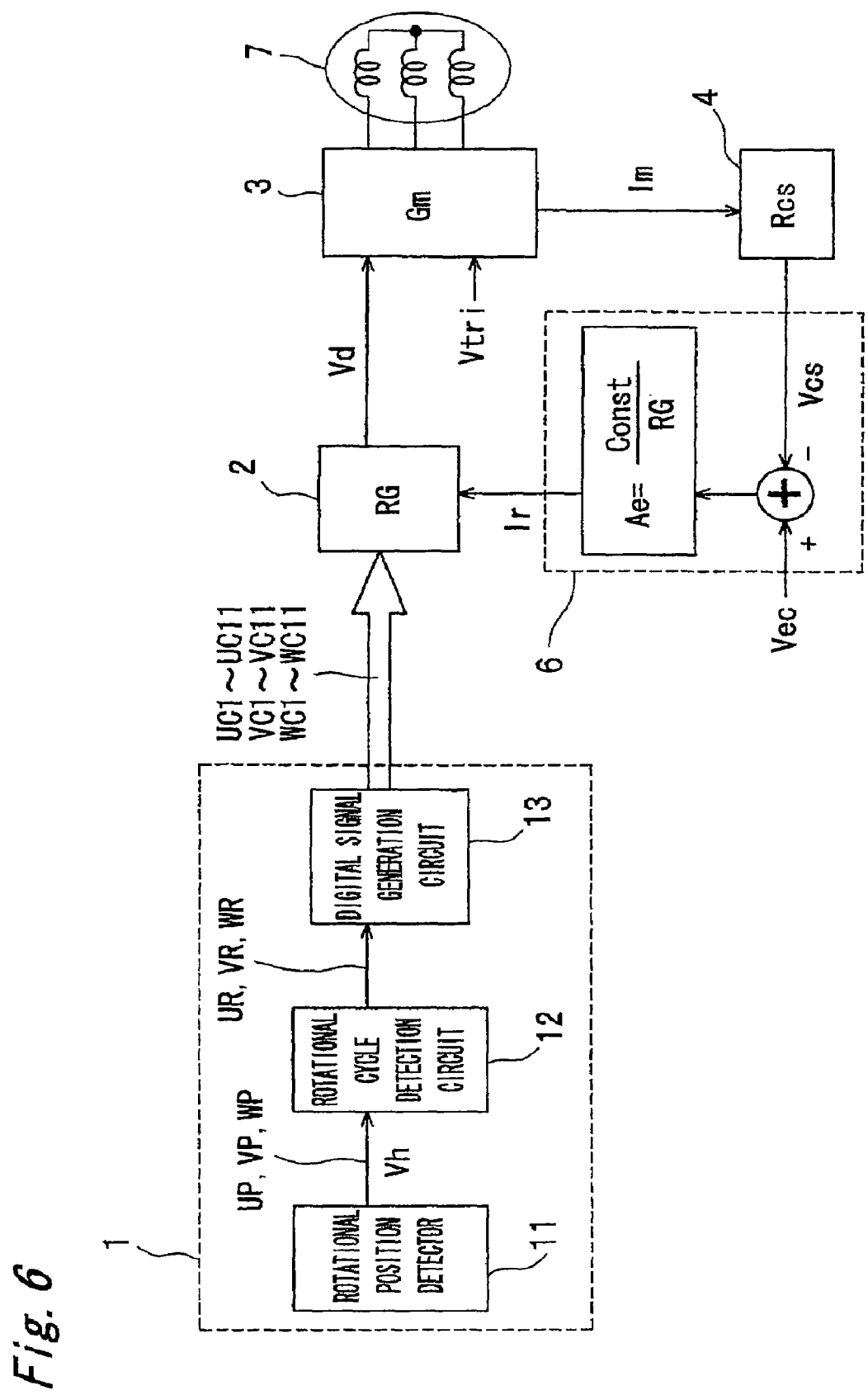
FIG. 6 is a block diagram for obtaining a gain of the motor driving apparatus of the present invention.

Next, a gain of the motor driving apparatus of the present invention is described. In the present embodiment, the gain of the motor driving apparatus is defined as "Im/Vec". FIG. 6 shows a block diagram for obtaining the gain of the motor driving apparatus of the present embodiment.

The rotational position detecting unit 1 generates the rotational cycle signals UR, VR, WR based on the rotational position detection signals UP, VP, WP of a voltage amplitude value Vh outputted from the rotational position detector 11, and generates the digital signal sequences UC1 to UC11, VC1 to VC11, WC1 to WC11 from the rotational cycle signals UR, VR, WR to input the generated digital signal sequences into the D/A conversion circuit 2.

When a transfer coefficient Ae of the error amplifier circuit 6 for comparing the current detection signal Vcs with the drive command signal Vec to output the error amplifier current signal Ir is defined as "Ir/(Vec−Vcs)", the error amplifier current signal Ir can be expressed by the expression (10).

$$Ir=Ae\times(Vec-Vcs) \qquad (10)$$

The D/A conversion circuit 2 outputs the three sinusoidal signals Uin, Vin, Win having the voltage amplitude value Vd based on the digital signal sequences UC1 to UC11, VC1 to VC11, WC1 to WC11 and the error amplifier current signal Ir. The voltage amplitude value Vd of the three sinusoidal signals Uin, Vin, Win outputted from the D/A conversion circuit 2 is expressed by the expression (11). The voltage amplification value Vd is given by a product of the total resistance value RG (=R1+R2+ . . . +R11) of the resistor strings R1 to R11 in the D/A conversion circuit 2 and the error amplification current signal Ir inputted into the D/A conversion circuit 2.

$$Vd=RG\times Ir \qquad (11)$$

When a transfer coefficient Gm of the drive circuit 3 is a transfer characteristic of the drive current Im with respect to the voltage amplitude value Vd in a case where respective prescribed values are given as the amplification value and the frequency of the carrier wave Vtri, the drive current Im that flows in the motor 7 can be expressed as in the expression (12) using the voltage amplitude value Vd of the sinusoidal signals Uin, Vin, Win and the transfer coefficient Gm of the drive circuit 3.

$$Im=Gm\times Vd \qquad (12)$$

The current detection signal Vcs can be expressed as in the expression (13) using the detection resistor of the resistance value Rcs of the current detection circuit 4. It is to be noted that Rcs shows a value of current/voltage conversion coefficient when the detection resistor is not used in the current detection circuit 4.

$$Vcs=Rcs\times Im \qquad (13)$$

According to the expressions (10), (11), (12), the drive current Im is expressed by the following expression (14).

$$Im=Gm\times RG\times Ae\times(Vec-Vcs) \qquad (14)$$

From the expressions (13), (14), the gain Im/Vec of the motor driving apparatus is expressed by the following expression (15).

$$Im/Vec=1/\{1/(Gm\times RG\times Ae)+Rcs\} \qquad (15)$$

In the expression (15), factors to determine the gain of the motor driving apparatus are Gm, RG, Ae, and Rcs. As described above, although the D/A conversion circuit 2 generates the sinusoidal signals Uin, Vin, Win based on the digital signal sequences UC1 to UC11, VC1 to VC11, WC1 to WC11 outputted from the rotational position detecting unit 1, a factor of the internal circuit of the rotational position detecting unit 1, for example the voltage amplitude value Vh of the rotational position detection signals, does not contribute to the voltage amplitude value Vd of the sinusoidal signals Uin, Vin, Win, as expressed in the expression (11). That is, the factor of the internal circuit of the rotational position detecting unit 1 does not become a factor related to the gain of the motor driving apparatus of the present invention. The use of the D/A conversion circuit 2 as thus described allows elimination of the effect of the circuit constants Ah, Vh of the conventional expression (6) in the expression (15) of the gain of the present invention.

Further, according to the expressions (9), (10), the transfer coefficient Ae of the error amplifier circuit 6 is converted as follows.

$$Ae=\alpha\times\beta/RG$$

Here, when $\alpha\times\beta$=Const (proportional constant), the expression (16) is expressed as follows.

$$Ae=\text{Const}/RG \qquad (16)$$

When the expression (16) is substituted into the gain Im/Vec of the motor driving apparatus in the expression (15), the gain is expressed by the expression (17).

$$Im/Vec=1/\{1/(Gm\times\text{Const})+Rcs\} \qquad (17)$$

Although the proportional constant Const is not a mathematical constant and varies in an actual circuit, the proportional constant Const in the circuit configuration of the present invention, i.e. ($\alpha\times\beta$), is led by a relative ratio of resistors. In a semiconductor integrated circuit, a relative ratio of resistors has very high variation accuracy, and is a constant having an ideal fixed value as compared with other circuit variations. Therefore, the proportional constant Const does not actually become a factor to generate variations. By making the relation between the resistance Re in the error amplifier circuit 6 and the resistance RG in the D/A conversion circuit 2 satisfy "RG/Re=$\beta$ (proportional constant)", variation factors in the expression (17) for the gain of the present invention can be confined to Gm and Rcs.

When the voltage amplitude value Vd of the sinusoidal signals Uin, vin, Win is small, the transfer coefficient Gm of the drive circuit 3 becomes small, and the first term including Gm in the denominator on the right-hand side of the expression (17) cannot be ignored with respect to Rcs in the second term. However, since the expression for the gain of the motor driving apparatus of the present invention has fewer variation factors than the expression (6) showing the gain of the conventional motor driving apparatus, the variations are small among individual apparatus even when the voltage amplitude value Vd is small. According to the present invention, it is possible to realize a motor driving apparatus in which characteristic fluctuations due to apparatus variations are small even when the drive current Im is small and the voltage amplitude value Vd of the sinusoidal signals is small, that is, the number of rotation of the motor is small.

In addition, although the rotational position detector 11 has the three hall elements 11U, 11V, 11W and the rotational cycle detection circuit 12 has the three comparators 12U, 12V, 12W in the configuration of FIG. 2, the internal configurations of the rotational position detector 11 and the rotational cycle detection circuit 12 are not limited. Any configurations and system can be applied to the configurations as long as the rotational position and the rotational cycle can be obtained. Further, the operations related to signal processing of the rotational cycle detection circuit 12 and the digital signal generation circuit 13 are not limited to the operations described above in the present embodiment. By a different method from the method of the present embodiment, the rotational position detection signals UP, VP, WP outputted from the hall elements 11U, 11V, 11W may be processed to generate the digital signal sequences UC1 to UC11, VC1 to VC11, WC1 to WC11 for the D/A conversion circuit 2 to form the sinusoidal signals Uin, Vin, Win for one rotation in the electrical angle.

Figure 7:
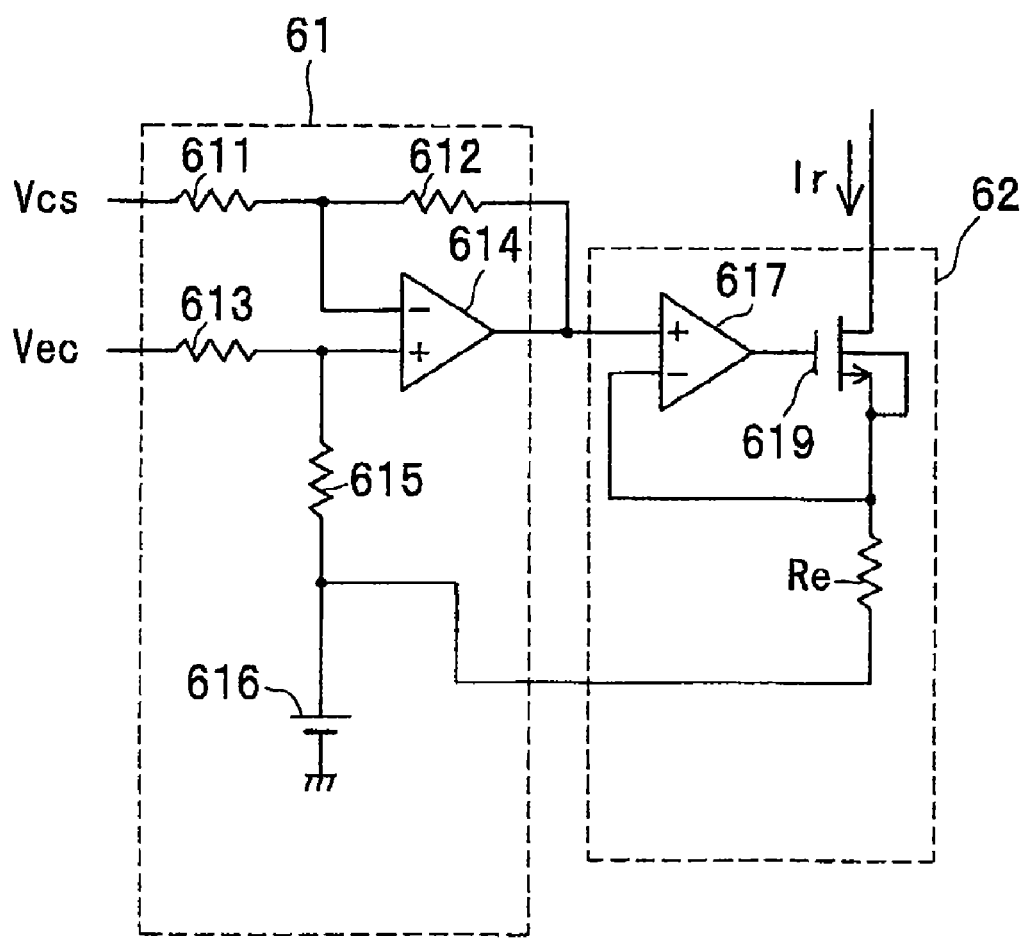
FIG. 7 is a view showing another example of internal circuits of the error amplifier circuit 6 of the present invention.

It is to be noted that in the V/I conversion circuit 62 in the error amplifier circuit 6 shown in FIG. 5, a PNP transistor may be used in place of the NPN transistor 618. Further, as shown in FIG. 7, a MOS transistor 619 may be used.

In addition, although the 11-bit decoders 133U, 133V, 133W generate the 11-bit digital signal sequences UC1 to UC11, VC1 to VC11, WC1 to WC11 in the present embodiment, the bit number n of the digital signal sequences is not limited to "11". n-bit (n is a positive integer not less than two) decoders 133U, 133V, 133W may generate n-bit digital signal sequences, and the D/A conversion circuit 2 may have n resistors and n switch elements which perform a switching operation based on the n-bit digital signal sequences.

Second Embodiment

Another D/A conversion circuit 2 included in the motor driving apparatus of the present invention is described with reference to FIGS. 8 and 9. In the present embodiment, the configurations other than that of the D/A conversion circuit 2 inside the motor driving apparatus are the same as those shown in FIG. 1. It should be noted that the value of the transfer coefficient of the error amplifier circuit 6 and the value of the digital signal sequence outputted from the digital signal generation circuit 13 are changed according to the configuration of the D/A conversion circuit.

In the present embodiment, n-bit (n is a positive integer not less than two) decoders 133U, 133V, 133W of the digital signal generation circuit 13 generate the digital signal sequences UC1 to UCn, VC1 to VCn, WC1 to WCn such that the D/A conversion output voltages Uin, Vin, Win outputted from the D/A conversion circuit 2 are sinusoidal waves, and output the generated digital signal sequences to the D/A conversion circuit 2.

Figure 8:
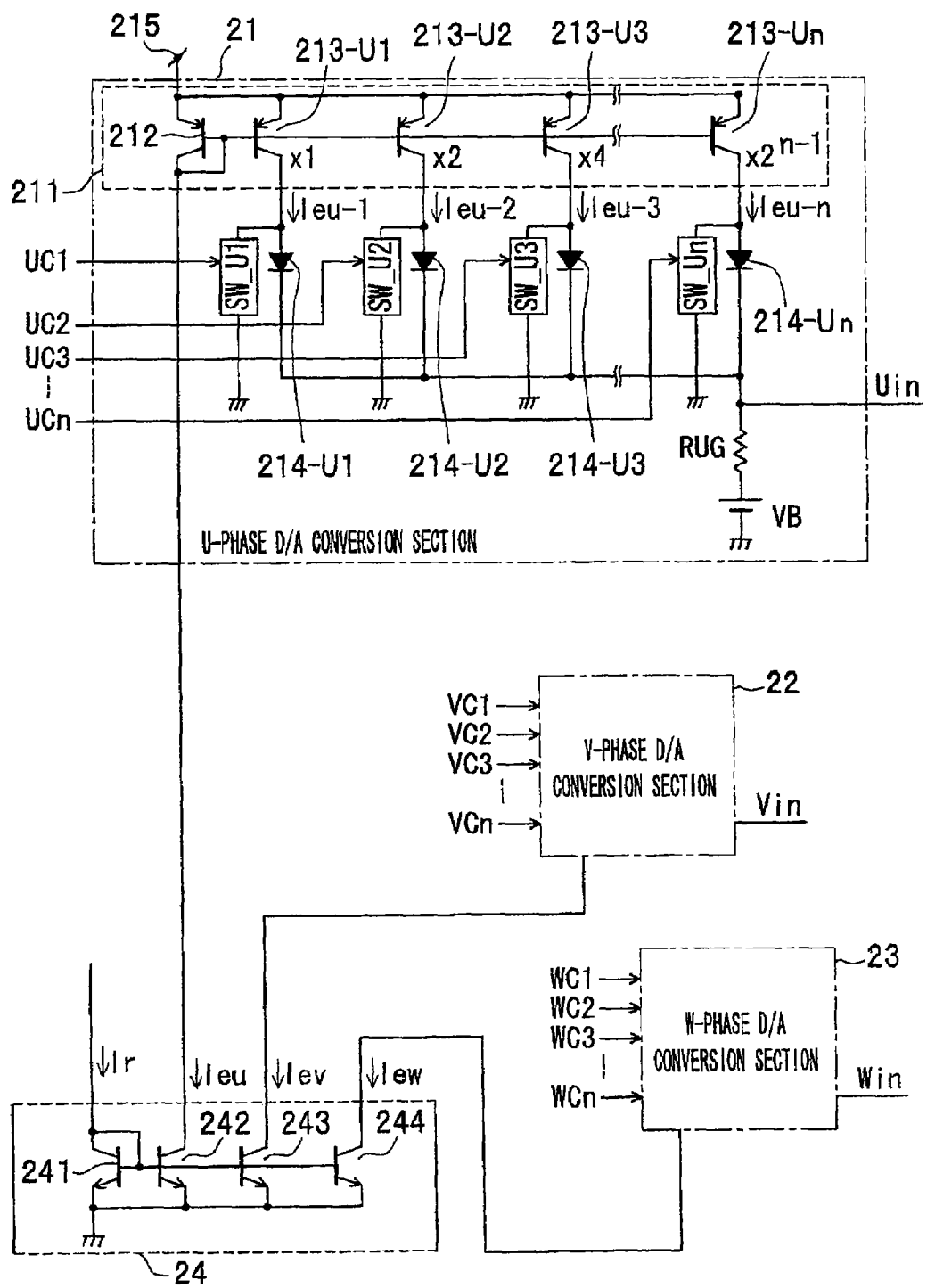
FIG. 8 is a view showing an internal configuration of the D/A conversion circuit 2 in a second embodiment of the present invention.

FIG. 8 shows the configuration of the D/A conversion circuit 2 of the present embodiment. The D/A conversion circuit 2 of the present embodiment has: D/A conversion sections 21, 22, 23 provided for the respective coil phases (three phases of the U-phase, V-phase and W-phase in the present embodiment) of the motor; and a current mirror circuit 24 for distributing phase error current signals Ieu, Iev, Iew of sizes proportional to the error amplifier current signal Ir to the respective D/A conversion sections 21, 22, 23.

The current mirror circuit 24 has an NPN transistor 241 with a collector and a base supplied with the error amplifier current signal Ir, and NPN transistors 242, 243, 244 with their bases connected to the base of the NPN transistor 241. Emitters of the four NPN transistors 241 to 244 are connected to a ground potential. NPN transistors 242, 243, 244 output from their collectors the phase error current signals Ieu, Iev, Iew of sizes proportional to the error amplifier current signal Ir.

In FIG. 8, since the internal configurations of a V-phase D/A conversion section 22 and a W-phase D/A conversion section 23 are the same as that of the U-phase D/A conversion section 21, illustrations of the sections 22, 23 are omitted. In the following, the U-phase D/A conversion section 21 is described as a typical example of the D/A conversion sections.

The U-phase D/A conversion section 21 has a current mirror circuit 211 for outputting a plurality of D/A conversion current signals Ieu-1 to Ieu-n (n is a positive integer not less than two) of prescribed sizes proportional to the phase error current signal Ieu. The current mirror circuit 211 has a PNP transistor 212, and PNP transistors 213-U1 to 213-Un. The PNP transistors 213-U1 to 213-Un have been weighed, and respectively output the D/A conversion current signals Ieu-1 to Ieu-n having a value of (phase error current signal Ieu×1) to (phase error current signal Ieu×$2^{n-1}$).

The U-phase D/A conversion section 21 further has: a current voltage conversion resistor RUG into which the D/A conversion current signals Ieu-1 to Ieu-n flow from its one end to output the D/A conversion output voltage Uin due to the voltage drop; a power supply VB, which is connected to the other end of the current voltage conversion resistor RUG and gives a bias voltage to the D/A conversion output voltage Uin; diodes 214-U1 to 214-Un connected to positions between the PNP transistors 213-U1 to 213-Un and the resistor RUG; and switch elements SW_U1 to SW_Un for controlling conduction or cutoff of the D/A conversion current signals Ieu-1 to Ieu-n flowing into the diodes 214-U1 to 213-Un for the purpose of outputting the D/A conversion output voltage Uin as sinusoidal signals.

In the current mirror circuit 211, a base of the PNP transistor 212 is connected to bases of the PNP transistors 213-U1 to 213-Un. Emitters of the PNP transistors 213-U1 to 213-Un are connected to a power supply 215. The phase error current signal Ieu is supplied to a collector and the base of the PNP transistor 212, and the D/A conversion current signals Ieu-1 to Ieu-n are outputted from collectors of the PNP transistors 213-U1 to 213-Un.

Anode terminals of the diodes 214-U1 to 214-Un are respectively connected to the collectors of the PNP transistors 213-U1 to 213-Un, and cathode electrodes of the diodes are connected to one another to be connected to one end of the resistor RUG.

One ends of the switch elements SW_U1 to SW_Un are connected to the anode terminals of the diodes 214-U1 to 214-Un and the other ends thereof are grounded. The switch elements SW_U1 to SW_Un switch ON/OFF based on the digital signal sequences UC1 to UCn, and control conduction and cutoff of the current that flows from the current mirror circuit 211 to the resistor RUG via the diodes 214-U1 to 214-Un.

In the U-phase D/A conversion section 21 with the configuration as thus described, in the case of inputting a digital signal sequence (001111 . . . ) from the digital signal generation circuit 13 shown in FIG. 1, only the switch elements SW_U1 and SW_U2 are switched off, and the other switch elements SW_U3 to SW_Un are switched on. At this time, only the D/A conversion current signals Ieu-1 and Ieu-2 flow into the resistor RUG, and the other D/A conversion current signals Ieu-3 to Ieu-n pass through the switch elements SW_U3 to SW_Un and flow to the ground potential. Thereby, the D/A conversion output voltage Uin according to the digital signal sequence is outputted from one end of the resistor RUG.

Even in the case of applying the D/A conversion circuit 2 of the second embodiment to the motor driving apparatus of FIG. 1, the same effect as that of the first embodiment can be obtained.

It is to be noted that in the present embodiment, the configuration of the error amplifier circuit 6 may be that of FIG. 5 or FIG. 7, or other configuration. However, in the present embodiment, the transfer coefficient [Ir/(Vec−Vcs)] of the error amplifier circuit 6 is inversely proportional to the respective resistance values of the current voltage conversion resistor RUG of each of the U-phase, the V-phase and the W-phase.

Figure 9:
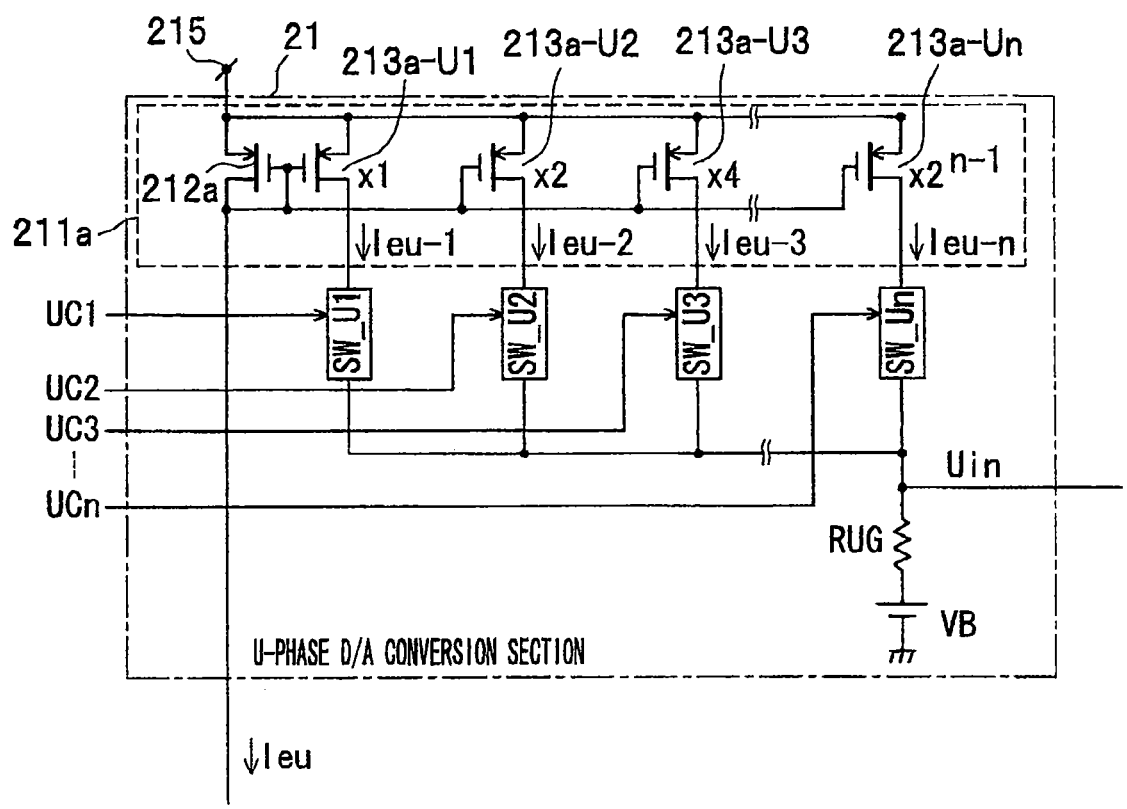
FIG. 9 is a view showing another example of an internal configuration of the D/A conversion circuit 2 in the second embodiment of the present invention.
Figure 10:
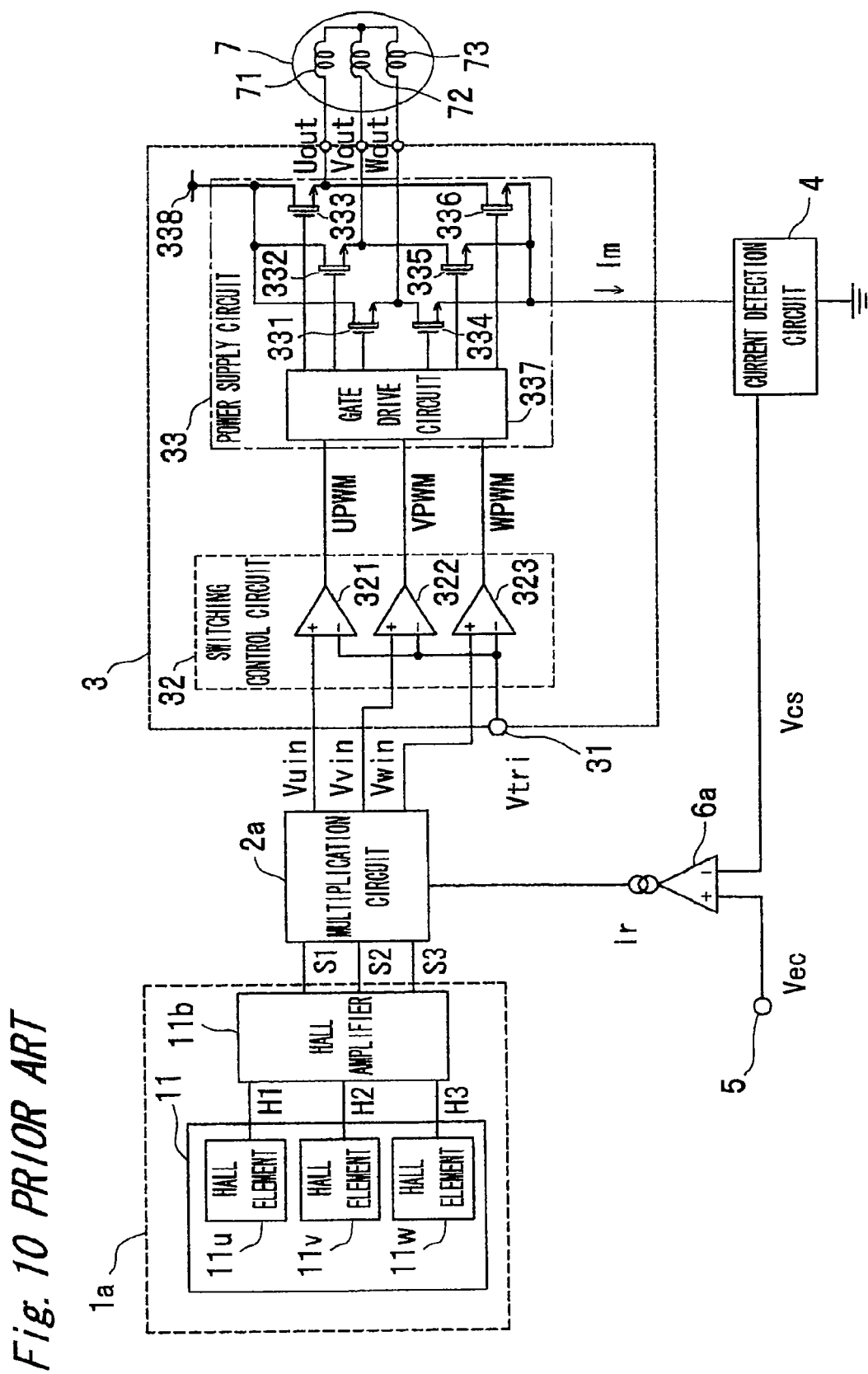
FIG. 10 is a view showing a configuration of a conventional motor driving apparatus.
Figure 11:
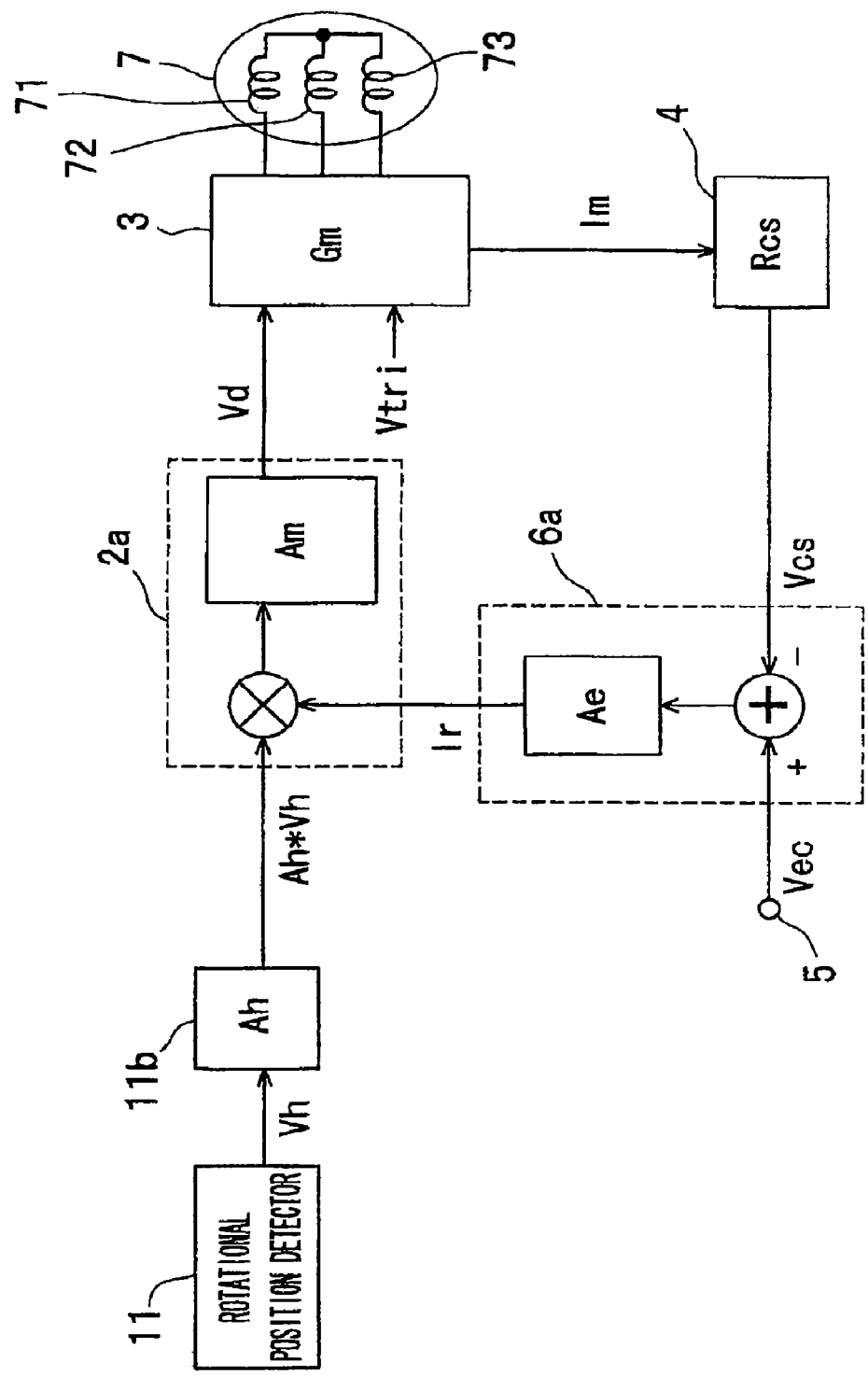
FIG. 11 is a block diagram for obtaining a gain of the conventional motor driving apparatus.

Further, the current mirror circuit 24, and the current mirror circuit 211 of each of the D/A conversion sections 21, 22, 23 of the U-phase, V-phase, W-phase are not limited to the NPN or PNP bipolar transistor, but PchMOS transistors 212a, 213a_U1 to 213a_Un may be used as shown in a current mirror circuit 211a of FIG. 9, or a NchMOS transistor may be used.

The present invention has the effect of allowing reduction in variations in circuit constants of individual motor driving apparatuses even in the case of rotating a motor with a small drive current, and thus is useful for a motor driving apparatus which performs PWM-driving.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2006-131284, filed on May 10, 2006, which is expressly incorporated herein by reference in its entirety.

What is claimed is:

1. A motor driving apparatus comprising:
   a rotational position detecting unit that detects a rotational position of a motor to output a digital signal sequence according to the rotational position;
   a D/A conversion circuit that generates an analog sinusoidal signal based on the digital signal sequence;
   a drive circuit that generates and outputs a drive voltage to the motor by means of the sinusoidal signal; and
   an error amplifier circuit that amplifies a difference between a current detection signal showing a current value of a drive current that flows in the motor and a drive command signal for controlling the drive current, and converts the amplified difference into a current to output the current as an error amplifier current signal, wherein
   the D/A conversion circuit comprises a resistor, and
   a transfer coefficient of the error amplifier circuit is inversely proportional to a resistance value of the D/A conversion circuit.

2. The motor driving apparatus according to claim 1, wherein the D/A conversion circuit comprises:
   a resistor string that has a plurality of resistors connected in series, and is connected to the error amplifier circuit to input the error amplifier current signal; and
   a plurality of switch elements that are provided in the same number as the number of phases of coils in the motor with respect to each resistor of the resistor string, and switches ON/OFF based on the digital signal sequence to output a voltage as the sinusoidal signal from any of connecting points between a plurality of resistors connected in series in the resistor string.

3. The motor driving apparatus according to claim 1, wherein
   the D/A conversion circuit comprises a D/A conversion section for each of the coil phases of the motor; and
   the D/A conversion section comprises:
   a current mirror circuit that outputs a plurality of currents proportional to the error amplifier current signal;
   a resistor that outputs, as the sinusoidal signal, a voltage generated by the current flowing from the current mirror circuit; and
   a plurality of switch elements that switches conduction and cutoff of the plurality of currents flowing from the current mirror circuit to the resistor based on the digital signal sequence.

4. The motor driving apparatus according to claim 3, wherein the current mirror circuit is organized by bipolar transistors or MOS transistors.

5. The motor driving apparatus according to claim 1, wherein the error amplifier circuit comprises:
a differential amplifier circuit that amplifies the difference between the current detection signal and the drive command signal to output the amplified difference; and
a V/I conversion circuit that outputs the error amplifier current signal proportional to a value obtained by dividing the output voltage of the differential amplifier circuit by the resistance value of the D/A conversion circuit, 6. The motor driving apparatus according to claim 5, wherein
the V/I conversion circuit comprises:
an operational amplifier having a non-inverting input terminal that receives the output voltage of the differential amplifier circuit;
a transistor having one end that is connected to an inverting input terminal of the operational amplifier, a control terminal that is connected to an output terminal of the operational amplifier, and another end that outputs the error amplifier current signal; and
a resistor that is connected to a connecting point between the transistor and the inverting input terminal of the operational amplifier, and a resistance value of the resistor in the V/I conversion circuit is proportional to the resistance value of the resistor in the D/A conversion circuit.

7. The motor driving apparatus according to claim 1, wherein
the rotational position detecting unit comprises:
a rotational position detector that detects a rotational position of the motor to output a rotational position detection signal of a sinusoidal signal;
a rotational cycle detection circuit that converts the rotational position detection signal into a rotational cycle signal of a rectangular wave showing a rotational cycle of the motor; and
a digital signal generation circuit that generates a clock signal from the rotational cycle signal, and while counting a cycle of the rotational cycle signal based on the clock signal, converts the count value into the digital signal sequence at a timing of the clock signal to output the digital signal sequence.

* * * * *